(12) United States Patent
Yasuda et al.

(10) Patent No.: US 10,326,183 B2
(45) Date of Patent: Jun. 18, 2019

(54) VEHICLE POWER SUPPLY SYSTEM

(71) Applicant: HONDA MOTOR CO., LTD., Tokyo (JP)

(72) Inventors: Tomofumi Yasuda, Wako (JP); Atsushi Mizutani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 15/544,275

(22) PCT Filed: Dec. 10, 2015

(86) PCT No.: PCT/JP2015/084681
§ 371 (c)(1),
(2) Date: Jul. 18, 2017

(87) PCT Pub. No.: WO2016/125389
PCT Pub. Date: Aug. 11, 2016

(65) Prior Publication Data
US 2017/0352929 A1    Dec. 7, 2017

(30) Foreign Application Priority Data

Feb. 5, 2015 (JP) .................................. 2015-020837

(51) Int. Cl.
*H01M 10/617* (2014.01)
*B60K 1/04* (2019.01)
(Continued)

(52) U.S. Cl.
CPC ............. *H01M 10/617* (2015.04); *B60K 1/04* (2013.01); *B60K 11/06* (2013.01);
(Continued)

(58) Field of Classification Search
CPC .................................. B60K 2001/0416–0438
See application file for complete search history.

(56) References Cited

U.S. PATENT DOCUMENTS 5,432,026 A * 7/1995 Sahm ................. B60H 1/00278
429/120
7,635,040 B2 * 12/2009 Seo .................... B60H 1/00278
180/68.1
(Continued)

FOREIGN PATENT DOCUMENTS

CN     101282852 A    10/2008
CN     103107382 A     5/2013
(Continued)

OTHER PUBLICATIONS

Office Action dated Oct. 15, 2018, issued in counterpart Chinese Application No. 201580073207.4, with English translation (11 pages).
(Continued)

*Primary Examiner* — Daniel Kessie
(74) *Attorney, Agent, or Firm* — Westerman, Hattori, Daniels & Adrian, LLP (57) ABSTRACT

A vehicle power supply system includes: a battery module; a cooling fan configured to taken in air from a passenger compartment of a vehicle; an upstream-side inlet duct that is disposed on an upstream side of the cooling fan; and a downstream-side inlet duct that is disposed on a downstream side of the cooling fan to connect the cooling fan and the battery module together. The cooling fan is disposed obliquely forwards or obliquely rearwards of the battery module, the downstream-side inlet duct is disposed on a lateral side of the battery module, the downstream-side inlet duct has a branching portion configured to divide air discharged from a discharge port of the cooling fan and to supply the air to the battery module, the branching portion is disposed between the cooling fan and the battery module, and the discharge port is directed towards the battery module.

10 Claims, 6 Drawing Sheets

(51) Int. Cl.

| | | |
|---|---|---|
| *B60K 11/06* | (2006.01) | |
| *H01M 10/625* | (2014.01) | |
| *H01M 10/6563* | (2014.01) | |
| *H01M 10/6556* | (2014.01) | |
| *H01M 10/6566* | (2014.01) | |
| *H01M 10/651* | (2014.01) | |
| *H01M 10/613* | (2014.01) | |
| *B60L 11/18* | (2006.01) | |
| *H01M 2/10* | (2006.01) | |
| *H01M 10/66* | (2014.01) | |
| *B60K 1/00* | (2006.01) | |

(52) U.S. Cl.
CPC ....... *B60L 11/1874* (2013.01); *H01M 2/1077* (2013.01); *H01M 10/613* (2015.04); *H01M 10/625* (2015.04); *H01M 10/651* (2015.04); *H01M 10/6556* (2015.04); *H01M 10/6563* (2015.04); *H01M 10/6566* (2015.04); *H01M 10/66* (2015.04); *B60K 2001/005* (2013.01); *B60K 2001/0416* (2013.01); *B60L 2240/34* (2013.01); *B60L 2240/36* (2013.01); *Y02T 10/7005* (2013.01); *Y02T 10/705* (2013.01)

(56) References Cited

U.S. PATENT DOCUMENTS

| | | | | |
|---|---|---|---|---|
| 7,900,727 | B2* | 3/2011 | Shinmura | B60K 1/04 180/68.1 |
| 9,277,674 | B2* | 3/2016 | Watanabe | H05K 7/20218 |
| 9,487,077 | B2* | 11/2016 | Tsuchiya | B60K 1/04 |
| 2009/0257190 | A1* | 10/2009 | Yoda | B60K 1/04 361/690 |
| 2009/0260905 | A1 | 10/2009 | Shinmura | |
| 2010/0193174 | A1* | 8/2010 | Nemoto | B60H 1/00278 165/202 |
| 2013/0078489 | A1 | 3/2013 | Kato et al. | |
| 2013/0092348 | A1* | 4/2013 | Bito | H01M 10/625 165/41 |
| 2013/0122338 | A1 | 5/2013 | Katayama et al. | |
| 2013/0298586 | A1 | 11/2013 | Hwang et al. | |
| 2013/0330587 | A1* | 12/2013 | Takahashi | H01M 2/1077 429/99 |
| 2014/0057150 | A1 | 2/2014 | Takizawa | |
| 2014/0212721 | A1 | 7/2014 | Hiranishi et al. | |
| 2017/0334309 | A1* | 11/2017 | Kouno | B60K 1/00 |

FOREIGN PATENT DOCUMENTS

| | | |
|---|---|---|
| CN | 103625267 A | 3/2014 |
| CN | 103972601 A | 8/2014 |
| CN | 104157805 A | 11/2014 |
| JP | 2001-105894 A | 4/2001 |
| JP | 2008-234870 A | 10/2008 |
| JP | 2013-67335 A | 4/2013 |

OTHER PUBLICATIONS

International Search Report dated Feb. 16, 2016, issued in counterpart International Application No. PCT/JP2015/084681 (1 page).

* cited by examiner

VEHICLE POWER SUPPLY SYSTEM

TECHNICAL FIELD

The present invention relates to a power supply system configured to be installed in a vehicle such as an electric vehicle or a hybrid electric vehicle.

BACKGROUND ART

A vehicle power supply system that stores battery modules is installed in an electric vehicle or a hybrid electric vehicle that uses a motor as a drive source (e.g., refer to Patent Literatures 1, 2). This type of vehicle power supply system includes a battery cooling unit for holding the temperature of a battery within a proper temperature range to prevent the deterioration in performance of the battery that is caused when the temperature of the battery is increased abnormally, and it is required to cool the battery modules as uniformly as possible in this battery cooling unit. For example, in a vehicle power supply system described in Patent Literature 1, air discharged from a cooling fan is divided to be supplied to two battery modules, whereby variation in cooling effect is suppressed.

PRIOR ART LITERATURE

Patent Literature

Patent Literature 1: JP-A-2001-105894
Patent Literature 2: JP-A-2013-67335

SUMMARY OF THE INVENTION

Problem that the Invention is to Solve

In the vehicle power supply system disclosed by Patent Literature 1, however, since the cooling fan is disposed in front of a battery case where the plurality of battery modules are stored, and air discharged from the cooling fan is divided at the center of a front wall of the battery case, this causes the cooling flow path to bend at a bending angle (a branching angle) of 90° at the branching portion, as a result of which a great pressure loss is generated at the branching portion, leading to fears that the cooling efficiency is reduced. Similarly, in a vehicle power supply system disclosed by Patent Literature 2, too, since an air inlet portion where outside air is taken in is provided at the center of the front of a battery case where a plurality of battery modules are stored, and air taken in from the air inlet portion is divided at the center of a front wall of the battery case, this also causes the cooling flow path to bend at a bending angle (a branching angle) of 90° at the branching portion, as a result of which a great pressure loss is generated, leading to fears that the cooling efficiency is reduced.

The present invention provides a vehicle power supply system that can reduce the pressure loss at a branching portion to thereby enhance the cooling efficiency thereof while adopting a configuration in which air that is discharged from a cooling fan is divided to be supplied to battery modules.

Means for Solving the Problem

The invention provides the following aspects. According to a first aspect, there is provided a vehicle power supply system (e.g., a battery unit 100 to be described in embodiment) including:

a battery module (e.g., battery modules 11 in embodiment);

a cooling fan (e.g., a cooling fan 117 in embodiment) configured to taken in air from a passenger compartment (e.g., a passenger compartment 6 in embodiment) of a vehicle (e.g., a vehicle 1 in embodiment);

an upstream-side inlet duct (e.g., an upstream-side inlet duct 118 in embodiment) that is disposed on an upstream side of the cooling fan; and a downstream-side inlet duct (e.g., a downstream-side inlet duct 122 in embodiment) that is disposed on a downstream side of the cooling fan to connect the cooling fan and the battery module together, wherein the cooling fan is disposed obliquely forwards or obliquely rearwards of the battery module, wherein the downstream-side inlet duct is disposed on a lateral side of the battery module, wherein the downstream-side inlet duct has a branching portion (e.g., a branching portion 116 in embodiment) configured to divide air discharged from a discharge port (e.g., a discharge port 117a in embodiment) of the cooling fan and to supply the air to the battery module, wherein the branching portion is disposed between the cooling fan and the battery module, and wherein the discharge port is directed towards the battery module.

According to a second aspect, in the vehicle power supply system according to the first aspect, the branching portion includes:

a cooling fan connecting flow path (e.g., a cooling fan connecting flow path 116a in embodiment) that is connected to the discharge port;

a first branching flow path (e.g., a first branching flow path 116b in embodiment) that separates air to be introduced to one side of the battery module; and a second branching flow path (e.g., a second branching flow path 116c in embodiment) that separates air to be introduced to an other side of the battery module, and a branching angle (e.g., a branching angle θ1 in embodiment) of the first branching flow path with respect to the cooling fan connecting flow path and a branching angle (e.g., a branching angle θ2 in embodiment) of the second branching flow path with respect to the cooling fan connecting flow path are obtuse angles.

According to a third aspect, in the vehicle power supply system according to the second embodiment, the first branching flow path is connected to a nearer side (e.g., a rear side in embodiment) of the battery module from the cooling fan, the second branching flow path is connected to a farther side (e.g., a front side in embodiment) of the battery module from the cooling fan, and the branching angle (e.g., the branching angle θ2 in embodiment) of the second branching flow path with respect to the cooling fan connecting flow path is greater than the branching angle (e.g., the branching angle θ1 in embodiment) of the first branching flow path with respect to the cooling fan connecting flow path.

According to a fourth aspect, in the vehicle power supply system according to the first to third aspects, the battery module is disposed underneath a floor of the vehicle.

According to a fifth aspect, in the vehicle power supply system according to the fourth aspect, the battery module is disposed underneath a luggage compartment (e.g., a battery storage space 5 in embodiment) of the vehicle and between a left rear wheel and a right rear wheel, and the cooling fan is disposed underneath the luggage compartment (e.g., a luggage compartment underside space 10 in embodiment) of the vehicle and at a rear of either one of the left rear wheel and the right rear wheel.

According to a sixth aspect, in the vehicle power supply system according to the fifth aspect, the battery module is fixed to left and right vehicle framework members (e.g., floor frames 8 in embodiment) that extend in a front-rear direction via a battery frame (e.g., a battery frame 14 in embodiment) that extends in a left-right direction of the vehicle, the battery frame has rising portions (e.g., rising portions 14c in embodiment) that slope up obliquely towards the battery module from fixing points (e.g., fixing points 14b in embodiment) to the left and right vehicle framework members, and the downstream-side duct is disposed so as to overlap partially the fixing point when seen from thereabove.

According to a seventh aspect, there is provided a vehicle power supply system (e.g., the battery unit 100 in embodiment) including:

a battery module (e.g., the battery modules 11 in embodiment);

a cooling fan (e.g., the cooling fan 117 in embodiment) configured to taken in air from a passenger compartment (e.g., the passenger compartment 6 in the embodiment) of a vehicle (e.g., the vehicle 1 in the embodiment);

an upstream-side inlet duct (e.g., the upstream-side inlet duct 118 in embodiment) that is disposed on an upstream side of the cooling fan; and a downstream-side inlet duct (e.g., the downstream-side inlet duct 122 in embodiment) that is disposed on a downstream side of the cooling fan to connect the cooling fan and the battery module together, the battery module being disposed underneath a luggage compartment (e.g., the battery storage space 5 in embodiment) of the vehicle, wherein the cooling fan is disposed obliquely rearwards of the battery module and underneath the luggage compartment (e.g., the luggage compartment underside space 10 in embodiment), wherein the downstream-side inlet duct includes:

a branching portion (e.g., the branching portion 116 in embodiment) configured to divide air discharged from a discharge port (e.g., the discharge port 117a in embodiment) of the cooling fan;

a first introducing duct portion (e.g., a first introducing duct portion 114 in embodiment) that is disposed at a rear of the battery module to introduce air that is divided by the branching portion to a rear side of the battery module; and a second introducing duct portion (e.g., a second introducing duct portion 115) that is disposed so as to extend from a front side to a left or right side of the battery module to introduce air that is divided by the branching portion to the front side of the battery module, wherein the branching portion is disposed between the cooling fan and the battery module, and wherein the discharge port is directed towards the battery module.

According to an eighth aspect, in the vehicle power supply system according to the seventh aspect, the branching portion includes:

a cooling fan connecting flow path (e.g., the cooling fan connecting flow path 116a in embodiment) that is connected to the discharge port;

a first branching flow path (e.g., the first branching flow path 116b in embodiment) that is connected to the first introducing duct portion; and a second branching flow path (e.g., the second branching flow path 116c in embodiment) that is connected to the second introducing duct portion, and a branching angle (e.g., the branching angle $\theta1$ in embodiment) of the first branching flow path with respect to the cooling fan connecting flow path and a branching angle (e.g., the branching angle $\theta2$ in embodiment) of the second branching flow path with respect to the cooling fan connecting flow path are obtuse angles.

According to a ninth aspect, in the vehicle power supply system according to the eighth aspect, the branching angle (e.g., the branching angle $\theta2$ in embodiment) of the second branching flow path with respect to the cooling fan connecting flow path is greater than the branching angle (e.g., the branching angle $\theta1$ in embodiment) of the first branching flow path with respect to the cooling fan connecting flow path.

According to a tenth aspect, in the vehicle power supply system according to the seventh to ninth aspects, the battery module is disposed between a left rear wheel and a right rear wheel, and the cooling fan is disposed at a rear of either one of the left rear wheel and the right rear wheel.

According to an eleventh aspect, in the vehicle power supply system according to the seventh to tenth aspects, the battery module is fixed to left and right vehicle framework members (e.g., the floor frames 8 in embodiment) that extend in a front-rear direction via a battery frame (e.g., the battery frame 14 in embodiment) that extends in a left-right direction of the vehicle, the battery frame has rising portions (e.g., the rising portions 14c in embodiment) that slope up obliquely towards the battery module from fixing points (e.g., the fixing points 14b in embodiment) thereof to the left and right vehicle framework members, the second introducing duct portion is disposed so as to overlap partially the fixing point when seen from thereabove, and the downstream-side inlet duct is disposed so that all of the branching portion, the first introducing duct portion and the second introducing duct portion are situated lower than an uppermost plane (e.g., an uppermost plane UP in embodiment) of the rising portions of the battery frame.

According to a twelfth aspect, in the vehicle power supply system according to the first to eleventh aspects, at least two battery modules are disposed along a front-rear direction or a left-right direction of the vehicle.

Advantages of the Invention

According to the first aspect, since the cooling fan is disposed obliquely forwards or rearwards of the battery module, the branching portion of the downstream-side inlet duct can be disposed near a corner portion of the battery module, so that air discharged from the cooling fan can be divided at a moderate branching angle. As a result of this, the pressure loss at the branching portion can be reduced to thereby enhance the cooling efficiency of the battery module while adopting the configuration in which air that is discharged from the cooling fan is divided to be supplied to the battery module. In addition, since the downstream-side inlet duct is disposed on a lateral side (including a front side, a rear side, a left side, and a right side other than an up side and a down side) of the battery module, the vehicle power supply system can be installed compact while suppressing the increase in height thereof.

According to the second aspect, since the branching angles of the two branching flow paths that are formed in the branching portion of the downstream-side inlet duct are both the obtuse angles relative to the cooling fan connecting flow path, the pressure loss that is generated at each of the branching flow paths can be reduced so as to enhance the cooling efficiency of the battery module.

According to the third aspect, since the branching angle of the second branching flow path that is connected to the farther side of the battery module from the cooling fan is greater than the branching angle of the first branching flow path that is connected to the nearer side of the battery module to the cooling fan, that is, the second branching flow path is bent more moderately than the first branching flow path, the cooling air can be distributed equally to the farther side and nearer side of the battery module irrespective of the length of the ducts on the downstream side of the branching portion.

According to the fourth aspect, since the battery module is disposed underneath the floor of the vehicle, the influence on the height of the passenger compartment can be suppressed.

According to the fifth aspect, since the battery module is disposed between the left and right rear wheels underneath the luggage compartment of the vehicle and since the cooling fan is disposed at the rear of one of the rear wheels underneath the luggage compartment of the vehicle, the vehicle power supply system can be installed compact without influencing negatively the capacity of the luggage compartment.

According to the sixth aspect, since the downstream-side inlet duct is disposed by making use of the space defined above the fixing point by the rising portion, the vehicle power supply system can be installed compact by suppressing the increase in height thereof.

According to the seventh aspect, since the cooling fan is disposed obliquely rearwards of the battery module, the branching portion of the downstream-side inlet duct can be disposed near a corner portion of the battery module, so that air discharged from the cooling fan can be divided at a moderate branching angle. As a result of this, the pressure loss at the branching portion can be reduced to thereby enhance the cooling efficiency of the battery module while adopting the configuration in which air that is discharged from the cooling fan is divided to be supplied to the battery module. In addition, since the first introducing duct portion and the second introducing duct portion are disposed on a lateral side (including a front side, a rear side, a left side, and a right side other than an up side and a down side) of the battery module, the influence on the capacity of the luggage compartment can be reduced.

According to the eighth aspect, since the branching angles of the two branching flow paths that are formed in the branching portion of the downstream-side inlet duct are both the obtuse angles relative to the cooling fan connecting flow path, the pressure loss that is generated at each of the branching flow paths can be reduced so as to enhance the cooling efficiency of the battery module.

According to the ninth aspect, cooling air can be distributed equally to the front side and the rear side of the battery module irrespective of the lengths of the ducts on the downstream side of the branching portion.

According to the tenth aspect, since the battery module is disposed between the left and right rear wheels and the cooling fan is disposed at the rear of either one of the left and right rear wheels, not only can the luggage compartment be expanded to the rear of the rear wheels, but also the vehicle power supply system can be installed compact without influencing negatively the capacity of the luggage compartment.

According to the eleventh aspect, since the downstream-side inlet duct is disposed so that all of the branching portion, the first introducing duct portion and the second introducing duct portion are disposed lower than the uppermost plane of the rising portion of the battery frame, the vehicle power supply system can be installed compact without influencing negatively the capacity of the luggage compartment.

According to the twelfth aspect, the plurality of battery modules can be cooled at the same time.

MODE FOR CARRYING OUT THE INVENTION

Hereinafter, an embodiment of a vehicle power supply system of the invention will be described based on the accompanying drawings. The drawings should be seen in a direction in which given reference numerals look normal. In the following description, front, rear, left, right, up and down denote accordingly directions as seen from a driver of the vehicle. The front, rear, left, right, up and down sides of the vehicle are denoted by Fr, Rr, L, R, U and D, respectively.

[Vehicle]

Figure 1:
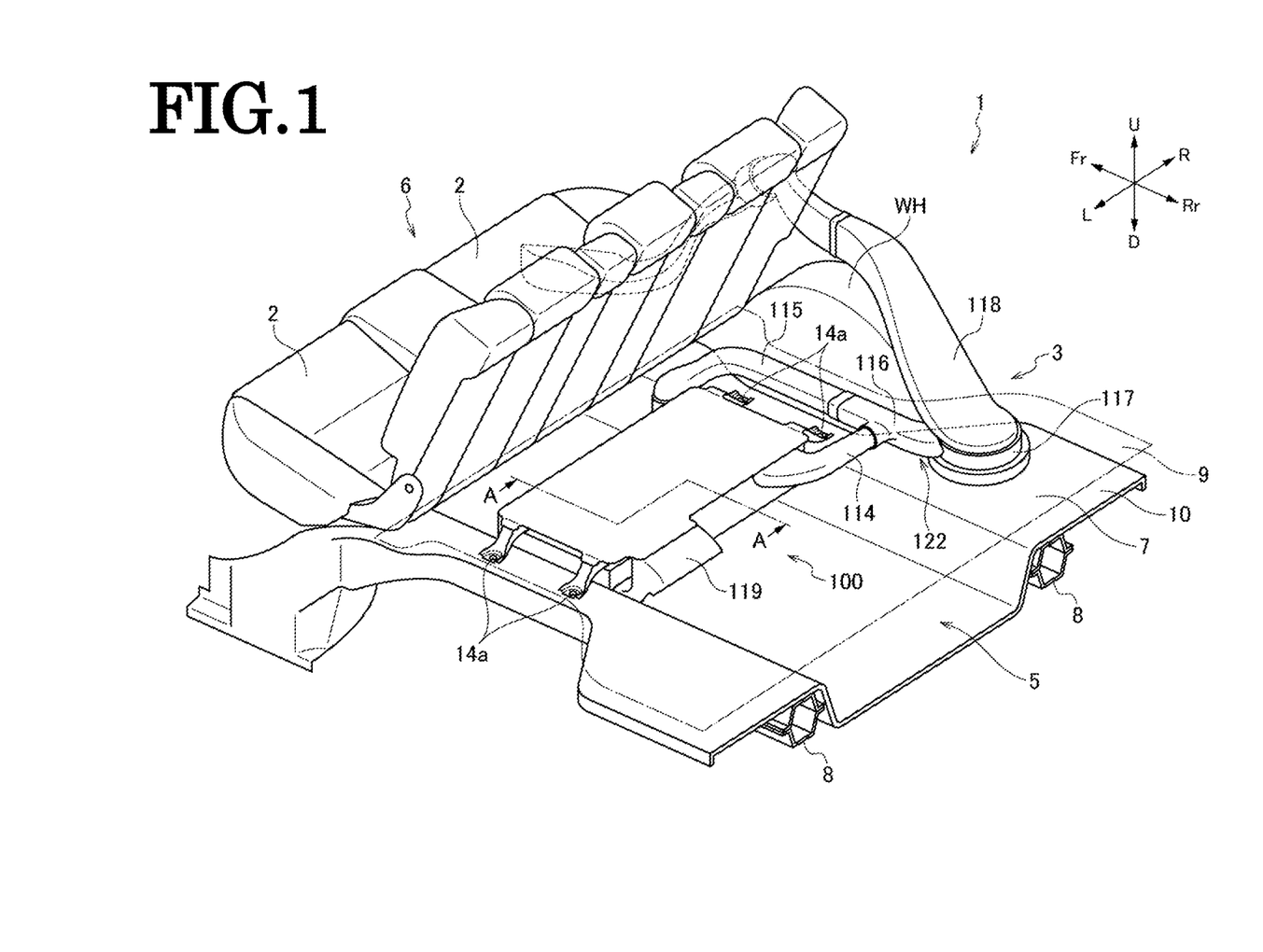
FIG. 1 is a perspective view showing a luggage compartment of a vehicle in which a battery unit according to an embodiment of the invention is disposed.

FIG. 1 is a perspective view showing a rear part of a passenger compartment 6 and a luggage compartment 3 of a vehicle 1 on which a battery unit 100 according to an embodiment of the invention is disposed.

As shown in FIG. 1, the vehicle 1 on which the battery unit 100 of this embodiment has the luggage compartment 3 at the rear of a rear seat 2 that is disposed on the passenger compartment 6. A battery storage space 5 is provided underneath the luggage compartment 3 by bending a floor panel 7 so as to form a recessed portion thereon, and a battery unit 100 of this embodiment is disposed in this battery storage space 5. A pair of floor frames 8 extends in a front-rear direction of the vehicle 1 beneath the floor panel 7 and at both sides of the battery storage space 5. The luggage compartment 3 is separated from a luggage compartment underside space 10 by a luggage board that covers the battery unit 100, extending portions of side trims and so on. Reference numeral 9 in FIG. 1 denotes a floor surface of the luggage compartment 3.

[Battery Unit]

Figure 2:
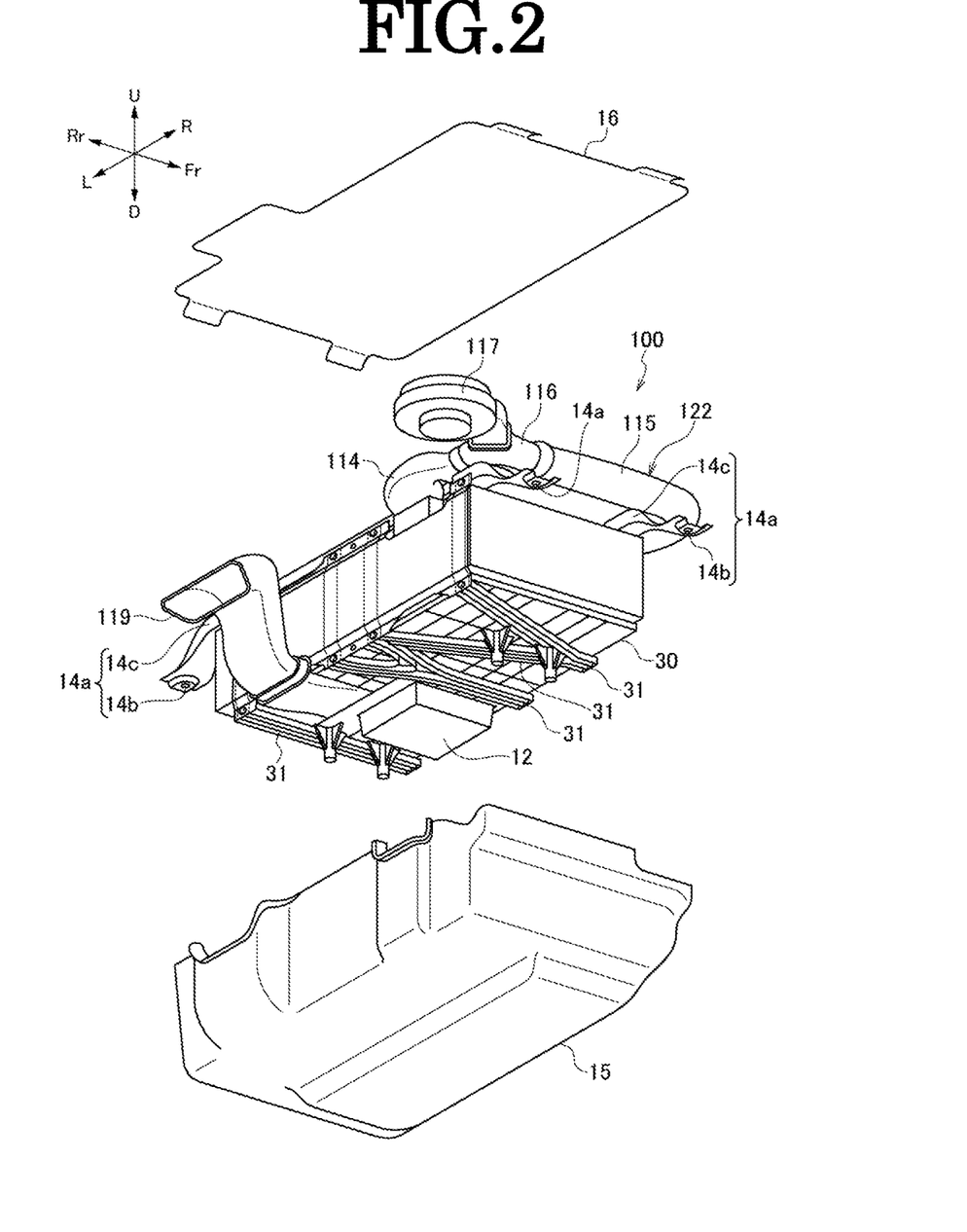
FIG. 2 is an exploded perspective view of the battery unit.
Figure 3:
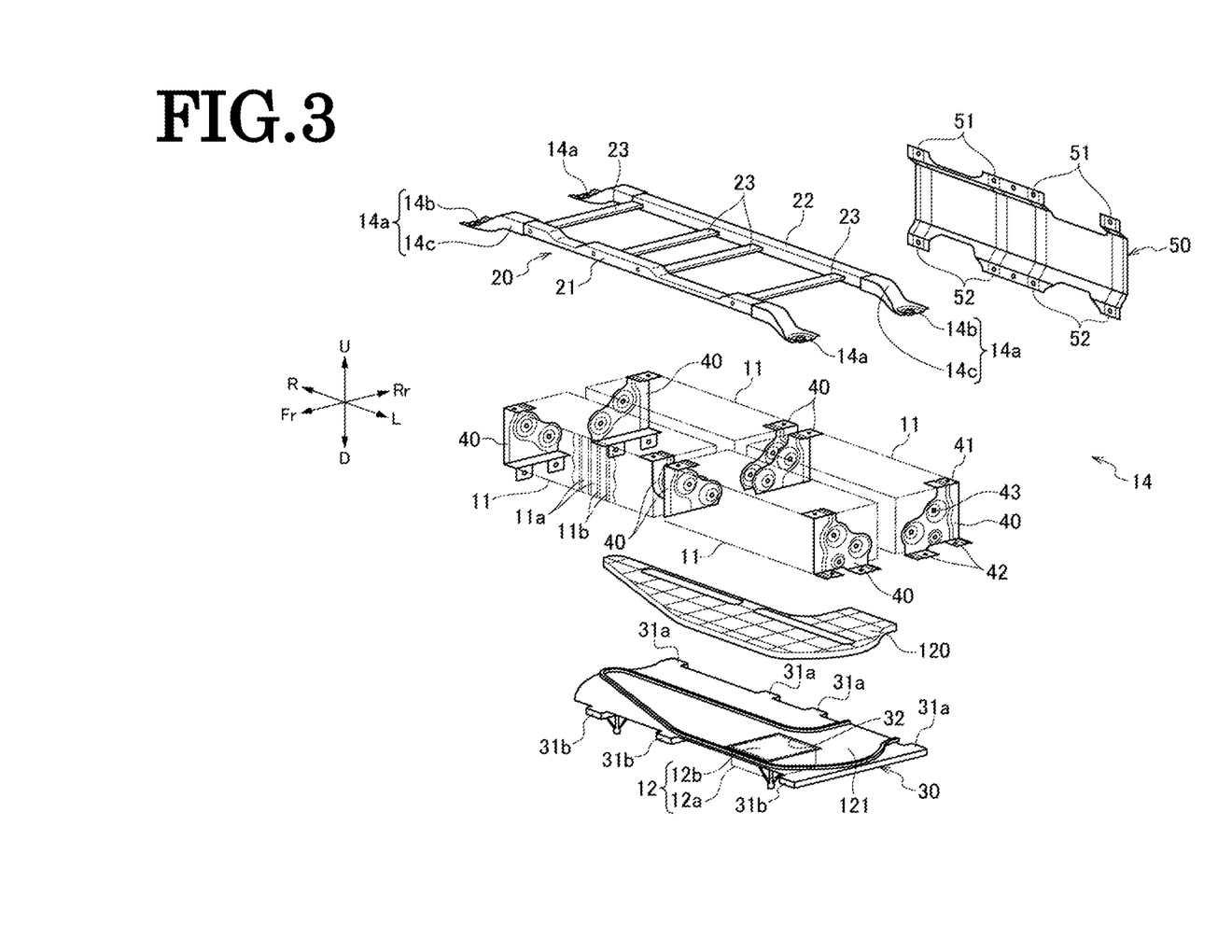
FIG. 3 is an exploded perspective view of a battery frame.
Figure 4:
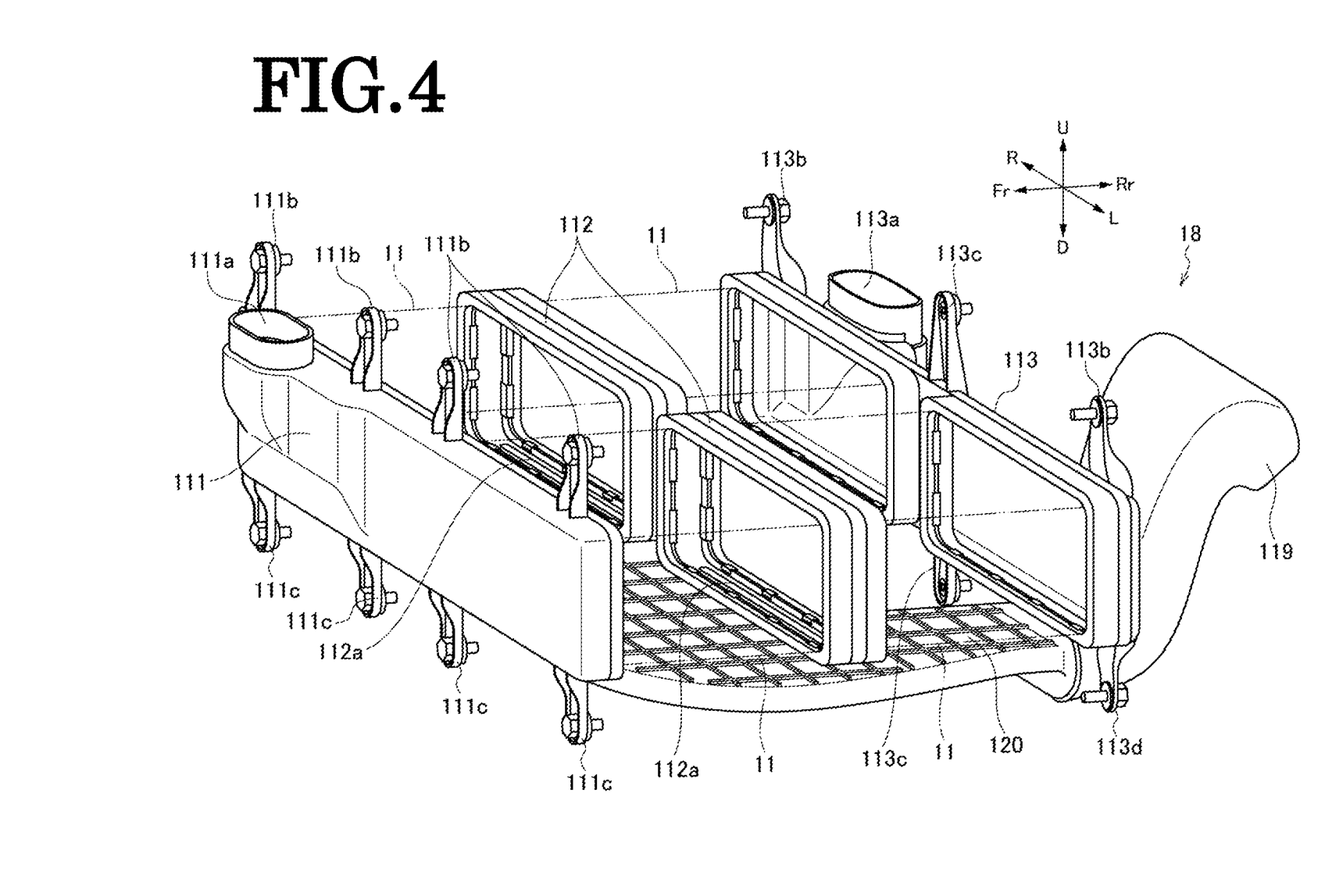
FIG. 4 is a perspective view showing battery modules and ducts.

FIG. 2 is an exploded perspective view of the battery unit 100 of this embodiment, FIG. 3 is an exploded perspective view of a battery frame 14, and FIG. 4 is a perspective view showing battery modules 11 and ducts.

As shown in FIGS. 2 to 4, the battery unit 100 of this embodiment includes the battery modules 11 each having a plurality of batteries 11a, a DC-DC converter 12, a battery frame 14 for holding the battery modules 11 and the DC-DC converter 12, a case 15 for storing the aforesaid constituent components, a cover 16 that covers an upper opening of the case 15, and a cooling mechanism 18 for cooling the battery modules 11 and the DC-DC converter 12. As shown in FIG. 1, fixing portions 14a of the battery frame 14 which project transversely to the left and right from the case 15 are fixed to the floor frames 8 via the floor panel 7, whereby not only are the battery modules 11 are disposed in the battery storage space 5, but also the battery unit 100 is disposed in a luggage compartment underside space 10. An upstream-side inlet duct 118 of the cooling mechanism 18, which will be described later, passes inside a right side trim to extend to a portion below the rear seat 2 as shown in FIG. 1.

[Battery Module]

As shown in FIG. 2, the battery modules 11 have individually a rectangular parallelepiped shape and are disposed in the battery unit 100 in such a way that longer or longitudinal sides of the battery modules 11 follow a left-right direction (or a transverse direction) of the vehicle 1. A plurality of batteries 11a, which are disposed vertically, are aligned in the transverse direction in each of the battery modules 11. The vertical arrangement of the batteries 11a means that a shortest side in three sides of the battery 11a extends in the transverse direction. In addition, cooling air flow paths 11b, which will be described later, are formed individually between the adjacent batteries 11a so as to extend along a front-rear direction of the vehicle 1, and these cooling air flow paths 11b constitute flow paths through which cooling air passes. The cooling air flow paths 11b are opened at front and rear sides and are closed airtight at upper and lower sides thereof.

The number of battery modules 11 that the battery unit 100 of this embodiment has is four, and these four battery modules 11 are disposed inside the battery unit 100 in such a way that two battery modules 11 are aligned side by side in the left and right direction and two battery modules 11 are aligned side by side in the front-rear direction (the lengthwise direction) of the vehicle 1. As shown in FIG. 4, in the left and right battery modules 11 disposed on the front side, front end portions thereof are fitted in a front duct 111, whereas rear end portions thereof are fitted individually in middle ducts 112. Additionally, in the left and right battery modules 11 disposed on the rear side, rear end portions thereof are fitted in a rear duct 113, whereas front end portions thereof are fitted individually in the middle ducts 112. The front duct 111, the middle duct 112 and the rear duct 113 make up the cooling mechanism 18 together with a downstream-side inlet duct 122 (including a first introducing duct portion 114, a second introducing duct portion 115 and a branch portion 116), which will be described later, a cooling fan 117, the upstream-side inlet duct 118, an outlet duct 119 and a cooling portion forming member 120.

Cooling air introducing ports 111a, 113a are formed at right end upper portions of the front duct 111 and the rear duct 113, respectively, and the cooling air introducing ports 111a, 113a are made to communicate with the cooling fan 117 by way of the downstream-side inlet duct 122. The cooling fan 117 takes in air from the passenger compartment 6 of the vehicle 1 by way of the upstream-side inlet duct 118 and sends the air so taken in towards the downstream-side inlet duct 122, where the air is divided into an air flow that flows into an interior of the front duct 111 and an air flow that flows into an interior of the rear duct 113. Air that is sent into the interiors of the front duct 111 and the rear duct 113 flows into the cooling air flow paths 11b of the battery modules 11 to cool the batteries 11a and then reaches an interiors of the middle ducts 112. The air that has reached the interior of the middle duct 112 is let out to an auxiliary component cooling portion 121 (refer to FIG. 3) that is situated below the battery modules 11 via outlet holes 112a that are formed in lower portions of the middle ducts 112 and cools the DC-DC converter 12 at the auxiliary component cooling portion 121. The cooling air that has cooled the DC-DC converter 12 is let out from the outlet duct 119 that is provided at a rear portion of the battery module 100 into the battery storage space 5 and is returned to the passenger compartment 6 of the vehicle 1 through the passenger compartment 6. The cooling fan 117 and the downstream-side inlet duct 122, both of which constitute a gist of the invention, will be described in detail after the description of the battery frame 14.

[Battery Frame]

As shown in FIG. 3, the battery frame 14 includes a frame assembly 20 that is disposed on the battery modules 11, a lower rigid member 30 that is disposed below the battery modules 11, a plurality of connecting members 40 that connects the lower rigid member 30 and the frame assembly 20 together and a rear protection member 50 that is disposed at the rear of the battery modules 11. The cooling portion forming member 120 is provided on an upper surface of the lower rigid body 30 and forms the auxiliary component cooling portion 121 in an interior space that is defined by the lower rigid member 30 and itself.

[Frame Assembly]

The frame assembly 20 is a ladder-shaped frame, when seen from thereabove, that has a front frame member 21 and a rear frame member 22 that extend in the transverse direction of the vehicle 1 that constitutes the longitudinal direction of the battery modules 11 and four connecting rigid members 23 that connect the front frame member 21 and the rear frame member 22 together.

The front frame member 21 and the rear frame member 22 have the shape of a hollow angular pipe, and the fixing portions 14a are provided integrally at left and right end portions of the front and rear frame members 21, 22, whereby the front and rear frame members 21, 22 are fixed to the floor frames 8 of the vehicle 1 via the fixing portions 14a as described above. The front duct 111 is bolted to the front frame member 21 via four upper attaching arm portions 111b (refer to FIG. 4) that are provided at an upper portion of the front duct 111 so as to extend individually upwards therefrom, and the rear duct 113 is bolted to the rear frame member 22 via two left and right upper attaching arm portions 113b (refer to FIG. 4) that are provided at an upper portion of the rear duct 113 so as to extend individually upwards therefrom. A clip is provided on a central arm portion 113c that is provided at a center of the rear duct 113 so as to extend vertically for use in fastening temporarily the rear protection member 50. The plurality of connecting rigid members 23 have individually an inverted U-shaped cross-sectional shape that opens downwards and are connected to upper end portions of the connecting members 40, whereby the connecting rigid members 23 hold the battery modules 11 in a suspended state via the connecting members 40.

The frame assembly 20 and the lower rigid member 30 are made to function as a load passing member that transmits impact to the front when the vehicle 1 is involved in a rear collision.

[Lower Rigid Member]

The lower rigid member 30 is a plate-shaped rigid member which makes up a bottom portion of the battery unit 100 and is connected to lower end portions of the connecting members 40 to thereby be held by the frame assembly 20 in a suspended state via the connecting members 40.

As shown in FIG. 1, a plurality of rib groups 31, which extend along the front-rear direction, are formed parallel on a lower surface portion of the lower rigid member 30 to transmit impact resulting when the vehicle 1 is involved in a rear collision to the front in an ensured fashion. A rear end portion 31a of each of the rib groups 31 projects further rearwards than the other portions of the lower rigid member 30, and a front end portion 31b of each of the rib groups 31 projects further forwards than the other portions of the lower rigid member 30, as shown in FIG. 3. The front duct 111 is bolted to the vicinity of the front end portions 31b of the rib groups 31 via four lower attaching arm portions 111c that are provided at a lower portion of the front duct 111 so as to extend downwards therefrom.

In addition, the DC-DC converter 12 is disposed on the lower surface portion of the lower rigid member 30. In this embodiment, the DC-DC converter 12 is disposed on a left front lower surface area when a lower surface area of the lower rigid member 30 is divided equally into four areas in the longitudinal and transverse directions. The DC-DC converter 12 includes a converter main body 12a and a plurality of cooling fins 12b that are erected on an upper surface of the DC-DC converter main body 12a. The DC-DC converter 12 is attached to the lower rigid member 30 so as to extend through a converter attaching hole 32 formed in the lower rigid member 30 in such a way that the converter main body 12a is positioned on a lower surface side of the lower rigid member 30 and the cooling fins 12b are positioned on an upper surface side of the lower rigid member 30 to thereby be exposed to the auxiliary component cooling portion 121.

[Connecting Member]

In this embodiment, an upper fixing portion 41 configured to be fixed to the frame assembly 20 is provided at an upper end portion of each of the connecting members 40, while lower fixing portions 42 configured to be fixed to the lower rigid member 30 are provided at a lower end portion thereof. Additionally, a battery attaching portion 43 is formed at a vertically middle portion of each of the connecting members 40, and left and right end portions of each of the battery modules 11 are attached to the battery attaching portions 43, whereby the battery modules 11 are held to the frame assembly 20 via the connecting members 40 in a suspended state.

[Rear Protection Member]

The rear protection member 50 is a member that is designed not only to protect the rear portion of the battery unit 100 when the vehicle 1 is involved in a rear collision but also to transmit impact resulting from the rear collision to the frame assembly 20 and the lower rigid member 30. Four upper fixing portions 51 configured to be fixed to the rear frame member 22 of the frame assembly 20 are provided at an upper end portion of the rear protection member 50, while four lower fixing portions 52 configured to be fixed to the lower rigid member 30 are provided at a lower end portion thereof. The four upper fixing portions 51 are fixed to a rear surface of the rear frame member 22 in positions lying behind the corresponding connecting rigid members 23 together with the two left and right upper attaching arm portions 113b (refer to FIG. 4) that are provided at the upper portion of the rear duct 113 so as to extend upwards therefrom. In addition, the four lower fixing portions 52 are fixed to the rear end portions 31a of the individual rib groups 31 of the lower rigid member 30 together with two left and right lower attaching arm portions 113d (refer to FIG. 4) that are provided at a lower portion of the rear duct 113 so as to extend downwards therefrom.

[Attachment of Battery Unit]

The battery unit 100, which is configured in the way described above, is built up in advance and is attached to the vehicle 1 in the way described above as a unit. The fixing portions 14a of the battery frame 14 each have a fixing point 14b that is fastened to the floor frame 8 and a rising portion 14c that slopes up obliquely from the fixing point 14b towards the battery module 11, and an attachment height of the battery unit 100 is defined by the rising portion 14c. Additionally, front and rear attachment positions of the battery unit 100 are defined so that at least the battery modules 11 are disposed between a left rear wheel and a right rear wheel.

Figure 5:
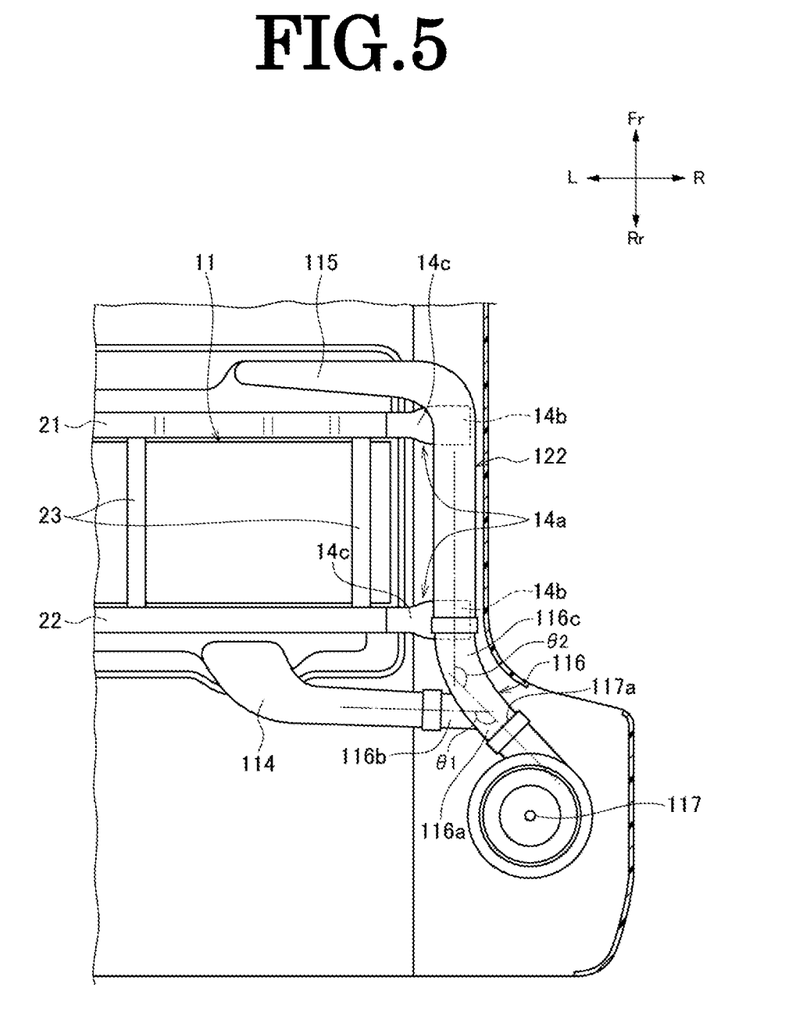
FIG. 5 is a plan view of a main part of the battery unit, showing a cooling fan and a downstream-side inlet duct.
Figure 6:
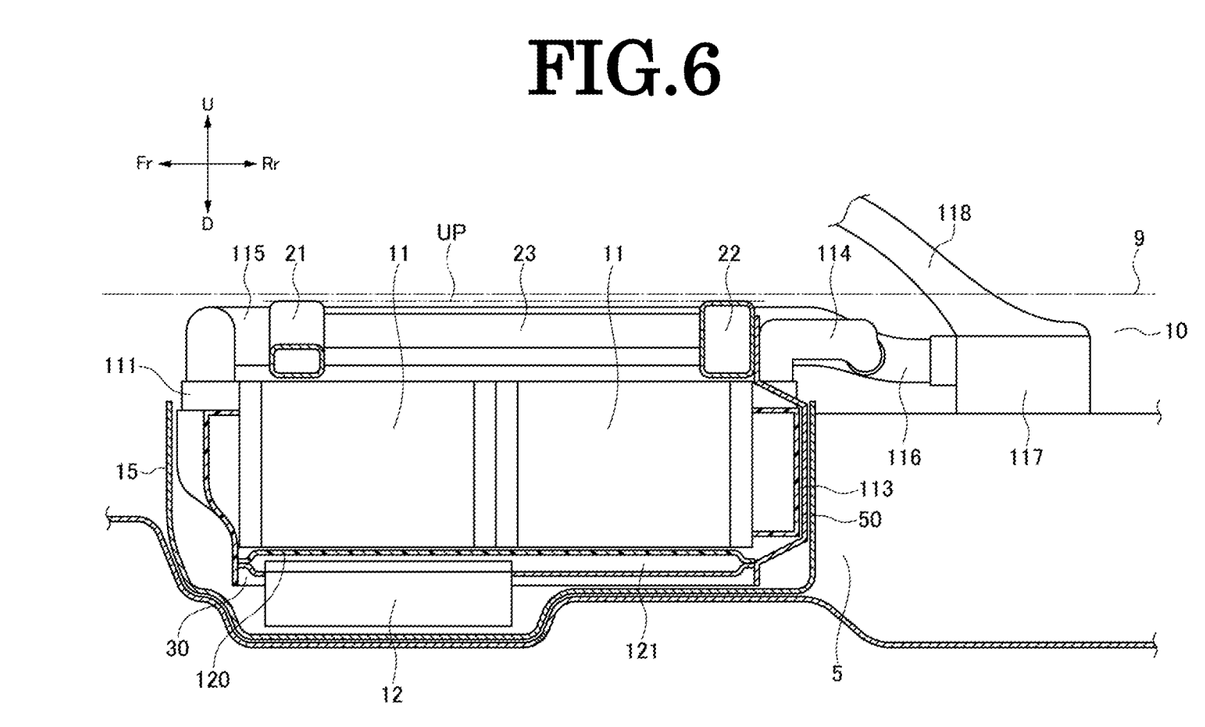
FIG. 6 is a partially sectional view taken along a line and seen in a direction indicated by arrows A in FIG. 1.

Next, the arrangement of the cooling fan 117 and the downstream-side inlet duct 122, which constitutes a gist of the invention, will be described by reference to FIGS. 1, 2, 5 and 6. FIG. 5 is a plan view of a main part of the cooling fan 117 and the downstream-side inlet duct 122, and FIG. 6 is a partially sectional view taken along a line and seen in a direction indicated by arrows A in FIG. 1.

[Cooling Fan]

The cooling fan 117 of this embodiment is a sirocco fan and is configured so that air is taken in from a suction port, not shown, that is formed in a rotation axis of a rotary fan (not shown) installed therein and the air so taken in is discharged from a discharge port 117a that projects in a tangential direction of the rotary fan. In this embodiment, the cooling fan 117 is attached to lie obliquely rightwards and rearwards of the battery modules 11, and the cooling fan 117 is specifically disposed at the rear of the right rear wheel in the luggage compartment underside space 10 underneath the luggage compartment 3. In FIG. 1, reference character WH denotes a wheel house that houses the right rear wheel. The discharge port 117a of the cooling fan 117 is directed towards the battery modules 11 and is connected to the branching portion 116 of the downstream-side inlet duct 122 that is disposed between the cooling fan 117 and the battery modules 11. Specifically, the discharge port 117a of the cooling fan 117 is directed towards a right rear end corner of battery module 11 and is connected to the branching portion 116 of the downstream-side inlet duct 122 that is provided near the right rear end corner of the battery module 11.

[Downstream-Side Inlet Duct]

The downstream-side inlet duct 122 includes the first introducing duct portion 114, the second introducing duct portion 115 and the branching portion 116 and is disposed at a lateral side of the battery modules 11. When referred to herein, "a lateral side" should include a front side, a rear side, left side, and a right side other than the up-down direction. To describe them specifically, the first introducing duct portion 114 is disposed at the rear of the battery module 11 and introduces air that is divided by the branching portion 116 into the rear duct 113, and the second introducing duct portion 115 is disposed at the front of the battery module 11 so as to be bent around to the right thereof and introduces air divided by the branching portion 116 into the front duct 111.

In the branching portion 116, there are formed a cooling fan connecting flow path 116a that is connected to the discharge port 117a of the cooling fan 117, a first branching flow path 116b that separates air that is to be introduced towards the rear side of the battery modules 11 and supplies the separated air into the first introducing duct portion 114, and a second branching flow path 116c that separates air that is to be introduced towards the front side portion of the battery modules 11 and supplies the separated air into the second introducing duct portion 115.

A branching angle θ1 of the first branching flow path 116b with respect to the cooling fan connecting flow path 116a and a branching angle θ2 of the second branching flow path 116c with respect to the cooling fan connecting flow path 116a are both obtuse angles so as to reduce a pressure loss at the branching portion 116. It is more preferable that the branching angle θ2 is greater than the branching angle θ1. By doing so, air is supplied preferentially into the second introducing duct portion 115 that is longer than the first introducing duct portion 114 and that is hence more liable to generate a pressure loss, whereby, irrespective of the lengths of the ducts, cooling air can be divided equally to the front duct 111 and the rear duct 113. The "greater branching angle" means that the relevant flow path is bent at a moderate bending angle.

In this embodiment, in disposing the downstream-side inlet duct 122 at the lateral side of the battery modules 11, the downstream-side inlet duct 122 is disposed so as to overlap partially the fixing portions 14a of the battery frame 14 when seen from thereabove. Specifically speaking, since the second introducing duct portion 115 is disposed by making use of a space defined above the fixing point 14b by the rising portion 14c of the fixing portion 14a, the second introducing duct portion 115 is caused to overlap the fixing point 14b of the fixing portion 14a when seen from thereabove. Further, the downstream-side inlet duct 122 of this embodiment is disposed, as shown in FIG. 6, so that the branching portion 116, the first introducing duct portion 114 and the second introducing duct portion 115 are situated at the same or lower level than an uppermost plane UP of the rising portion 14c so as to eliminate any influence on the capacity of the luggage compartment 3.

Thus, as has been described heretofore, according to the battery unit 100 of this embodiment, since the cooling fan 117 is disposed obliquely rearwards of the battery modules 11, the branching portion 116 of the downstream-side inlet duct 122 can be disposed near the corner portion of the battery module 11, so that air discharged from the cooling fan 117 can be divided at the moderate branching angle. As a result of this, the pressure loss at the branching portion 116 can be reduced to thereby enhance the cooling efficiency of the battery modules 11 while adopting the configuration in which air that is discharged from the cooling fan 117 is divided to be supplied to the battery modules 11. In addition, since the downstream-side inlet duct 122 is disposed beside the battery modules 11, the battery unit 100 can be installed compact while suppressing the increase in height thereof.

Additionally, since the branching angles θ1, θ2 of the two branching flow paths 116b, 116c that are formed in the branching portion 116 of the downstream-side inlet duct 122 are both the obtuse angles relative to the cooling fan connecting flow path 116a, the pressure loss that is generated at each of the branching flow paths 116b, 116c can be reduced so as to enhance the cooling efficiency of the battery modules 11.

Since the branching angle θ2 of the second branching flow path 116c that is connected to the farther side of the battery modules 11 from the cooling fan 117 is greater than the branching angle θ1 of the first branching flow path 116b that is connected to the nearer side of the battery modules 11 to the cooling fan 117, the cooling air can be distributed equally to the farther side and nearer side of the battery modules 11 irrespective of the length of the ducts on the downstream side of the branching portion 116.

Since the battery modules 11 are disposed between the left and right rear wheels underneath the luggage compartment 3 of the vehicle 1 and the cooling fan 117 is disposed at the rear of the right rear wheel underneath the luggage compartment 3 of the vehicle 1, the battery unit 100 can be installed compact without influencing negatively the capacity of the luggage compartment 3.

Since the downstream-side inlet duct 122 is disposed by making use of the space defined above the fixing point 14b by the rising portion 14c, the battery unit 100 can be installed compact by suppressing the increase in height thereof.

Since the downstream-side inlet duct 122 is disposed so that all of the branching portion 116, the first introducing duct portion 114 and the second introducing duct portion 115 are disposed lower than the uppermost plane UP of the rising portion 14c of the battery frame 14, the battery unit 100 can be installed compact without influencing negatively the capacity of the luggage compartment 3.

The invention is not limited to the embodiment that has been described heretofore and hence can be modified or improved as required.

For example, while the battery unit 100 of the embodiment described above is disposed in the luggage compartment underside space 10 that is the space defined underneath the luggage compartment 3, the battery unit 100 may be disposed in any other underside space than that underneath the luggage compartment 3 (e.g., an underside space defined underneath the passenger compartment 6), provided that the battery unit 100 is disposed underneath the floor of the vehicle.

Additionally, the cooling fan 117 may be disposed not only at the rear of the right rear wheel but also at the rear of the left rear wheel and may be disposed obliquely forwards of the battery modules 11. Further, the cooling fan 117 may be disposed within the side trim as long as the cooling fan 117 is disposed obliquely forwards or rearwards of the battery modules 11.

This patent application is based on Japanese Patent Application (No. 2015-020837) filed on Feb. 5, 2015, the contents of which are incorporated herein by reference.

DESCRIPTION OF REFERENCE NUMERALS AND CHARACTERS

1 Vehicle
3 Luggage compartment
5 Battery storage space (Space underneath a luggage compartment of vehicle)
6 Passenger compartment
8 Floor frame (Vehicle framework member)
10 Luggage compartment underside space (Space underneath a luggage compartment of vehicle)
11 Battery module
14 Battery frame
14b Fixing point
14c Rising portion
100 Battery unit (Vehicle power supply system)
114 First introducing duct portion
115 Second introducing duct portion
116 Branching portion
116a Cooling fan connecting flow path
116b First branching flow path
116c Second branching flow path
117 Cooling fan 117a Discharge port
118 Upstream-side inlet duct
122 Downstream-side inlet duct
θ1 Branching angle of first branching flow path
θ2 Branching angle of second branching flow path
UP Uppermost surface of rising portion

The invention claimed is:

1. A vehicle power supply system comprising: a battery module; a cooling fan configured to take in air from a passenger compartment of a vehicle; an upstream-side inlet duct that is disposed on an upstream side of the cooling fan; and a downstream-side inlet duct that is disposed on a downstream side of the cooling fan to connect the cooling fan and the battery module together, wherein the cooling fan is disposed obliquely forwards or obliquely rearwards of the battery module, wherein the downstream-side inlet duct is disposed on a lateral side of the battery module, wherein the downstream-side inlet duct has a branching portion configured to divide air discharged from a discharge port of the cooling fan and to supply the air to the battery module, wherein the branching portion is disposed between the cooling fan and the battery module, wherein the discharge port is directed towards the battery module, wherein the branching portion comprises: a cooling fan connecting flow path that is connected to the discharge port; a first branching flow path that separates air to be introduced to one side of the battery module; and a second branching flow path that separates air to be introduced to an other side of the battery module, and wherein a branching angle of the first branching flow path with respect to the cooling fan connecting flow path and a branching angle of the second branching flow path with respect to the cooling fan connecting flow path are obtuse angles.

2. The vehicle power supply system according to claim 1,
wherein the first branching flow path is connected to a nearer side of the battery module from the cooling fan,
wherein the second branching flow path is connected to a farther side of the battery module from the cooling fan, and
wherein the branching angle of the second branching flow path with respect to the cooling fan connecting flow path is greater than the branching angle of the first branching flow path with respect to the cooling fan connecting flow path.

3. The vehicle power supply system according to claim 1, wherein the battery module is disposed underneath a floor of the vehicle.

4. The vehicle power supply system according to claim 3,
wherein the battery module is disposed underneath a luggage compartment of the vehicle and between a left rear wheel and a right rear wheel, and
wherein the cooling fan is disposed underneath the luggage compartment of the vehicle and at a rear of either one of the left rear wheel and the right rear wheel.

5. The vehicle power supply system according to claim 4,
wherein the battery module is fixed to left and right vehicle framework members that extend in a front-rear direction via a battery frame that extends in a left-right direction of the vehicle,
wherein the battery frame has rising portions that slope up obliquely towards the battery module from fixing points to the left and right vehicle framework members, and
wherein the downstream-side duct is disposed so as to overlap partially the fixing point when seen from thereabove.

6. A vehicle power supply system comprising: a battery module; a cooling fan configured to take in air from a passenger compartment of a vehicle; an upstream-side inlet duct that is disposed on an upstream side of the cooling fan; and a downstream-side inlet duct that is disposed on a downstream side of the cooling fan to connect the cooling fan and the battery module together, the battery module being disposed underneath a luggage compartment of the vehicle, wherein the cooling fan is disposed obliquely rearwards of the battery module and underneath the luggage compartment, wherein the downstream-side inlet duct comprises: a branching portion configured to divide air discharged from a discharge port of the cooling fan; a first introducing duct portion that is disposed at a rear of the battery module to introduce air that is divided by the branching portion to a rear side of the battery module; and a second introducing duct portion that is disposed so as to extend from a front side to a left or right side of the battery module to introduce air that is divided by the branching portion to the front side of the battery module, wherein the branching portion is disposed between the cooling fan and the battery module, wherein the discharge port is directed towards the battery module, wherein the branching portion comprises: a cooling fan connecting flow path that is connected to the discharge port; a first branching flow path that is connected to the first introducing duct portion; and a second branching flow path that is connected to the second introducing duct portion, and wherein a branching angle of the first branching flow path with respect to the cooling fan connecting flow path and a branching angle of the second branching flow path with respect to the cooling fan connecting flow path are obtuse angles.

7. The vehicle power supply system according to claim 6,
wherein the branching angle of the second branching flow path with respect to the cooling fan connecting flow path is greater than the branching angle of the first branching flow path with respect to the cooling fan connecting flow path.

8. The vehicle power supply system according to claim 6,
wherein the battery module is disposed between a left rear wheel and a right rear wheel, and
wherein the cooling fan is disposed at a rear of either one of the left rear wheel and the right rear wheel.

9. The vehicle power supply system according to claim 6,
wherein the battery module is fixed to left and right vehicle framework members that extend in a front-rear direction via a battery frame that extends in a left-right direction of the vehicle,
wherein the battery frame has rising portions that slope up obliquely towards the battery module from fixing points thereof to the left and right vehicle framework members,
wherein the second introducing duct portion is disposed so as to overlap partially the fixing point when seen from thereabove, and
wherein the downstream-side inlet duct is disposed so that all of the branching portion, the first introducing duct portion and the second introducing duct portion are situated lower than an uppermost plane of the rising portions of the battery frame.

10. The vehicle power supply system according to claim 1,
wherein at least two battery modules are disposed along a front-rear direction or a left-right direction of the vehicle.

* * * * *